United States Patent
Levine

(10) Patent No.: US 12,302,926 B2
(45) Date of Patent: May 20, 2025

(54) METHOD TO PRODUCE HIGH PROTEIN RESIDUALS

(71) Applicant: Digested Organics LLC, Plymouth, MI (US)

(72) Inventor: Robert Levine, Ann Arbor, MI (US)

(73) Assignee: DIGESTED ORGANICS LLC, Plymouth, MI (US)

( * ) Notice: Subject to any disclaimer, the term of this patent is extended or adjusted under 35 U.S.C. 154(b) by 0 days.

(21) Appl. No.: 17/587,111

(22) Filed: Jan. 28, 2022

(65) Prior Publication Data

US 2022/0240544 A1 Aug. 4, 2022

Related U.S. Application Data

(60) Provisional application No. 63/142,555, filed on Jan. 28, 2021.

(51) Int. Cl.
*A23K 10/38* (2016.01)
*A23K 30/20* (2016.01)
(Continued)

(52) U.S. Cl.
CPC .............. *A23K 10/38* (2016.05); *A23K 30/20* (2016.05); *A23K 40/20* (2016.05); *A23L 29/30* (2016.08);
(Continued)

(58) Field of Classification Search
CPC ........ A23K 10/38; A23K 30/20; A23K 40/20; A23L 29/30; C02F 1/441; C02F 2103/32;
(Continued)

(56) References Cited

U.S. PATENT DOCUMENTS

| 2,067,931 A | 1/1937 | Kniskern et al. |
| 3,234,005 A | 2/1966 | Smalter et al. |

(Continued)

FOREIGN PATENT DOCUMENTS

| EP | 1070690 A2 | 1/2001 |
| WO | 2020/146941 A1 | 7/2020 |
| WO | 2021072551 A1 | 4/2021 |

OTHER PUBLICATIONS

Battino et al., The Solubility of Nitrogen and Air in Liquids, Journal of Physical and Chemical Reference Data vol. 13, No. 2, pp. 563-600 (1984), Department of Chemistry, Wright State University, Dayton, Ohio.

(Continued)

*Primary Examiner* — Joseph W Drodge
(74) *Attorney, Agent, or Firm* — CANTOR COLBURN LLP

(57) ABSTRACT

A system for treating whole stillage includes a stillage tank, a separation system in communication with the stillage tank and configured to separate the whole stillage into a wet cake portion and a thin stillage portion, and a primary filtration system in communication with the separation system. The primary filtration system can be configured to separate the thin stillage into a primary concentrate and a primary permeate. A secondary filtration system in communication with the primary filtration system can be configured to further purify the primary permeate. A water reclamation system in communication with the primary and/or secondary filtration system can remove water from the permeate. An additive can be added to the primary permeate to precipitate phosphorus-containing minerals and corn oil can be advantageously extracted from the primary concentrate. Protein-enriched animal feeds can be generated from dehydration of the primary concentrate.

14 Claims, 3 Drawing Sheets

(51) Int. Cl.

| | |
|---|---|
| *A23K 40/20* | (2016.01) |
| *A23L 29/30* | (2016.01) |
| *B01D 61/14* | (2006.01) |
| *B01D 61/20* | (2006.01) |
| *C02F 1/44* | (2023.01) |
| *C11B 1/04* | (2006.01) |
| *C11B 3/00* | (2006.01) |
| *C11B 13/00* | (2006.01) |
| *C12F 3/10* | (2006.01) |
| *C02F 103/32* | (2006.01) |

(52) U.S. Cl.
CPC ........... *B01D 61/147* (2013.01); *B01D 61/20* (2013.01); *C02F 1/441* (2013.01); *C11B 1/04* (2013.01); *C11B 3/008* (2013.01); *C11B 13/00* (2013.01); *C12F 3/10* (2013.01); *C02F 2103/32* (2013.01)

(58) Field of Classification Search
CPC . C02F 1/445; C11B 1/04; C11B 3/008; C11B 13/00; C12F 3/10; B01D 61/02; B01D 61/025; B01D 61/026; B01D 61/027; B01D 61/0271; B01D 61/029; B01D 61/04; B01D 61/147; B01D 61/1471; B01D 61/149; B01D 61/20; B01D 61/58; B01D 2311/02; B01D 2311/04; B01D 2311/06; B01D 2311/08; B01D 2311/12; B01D 2311/2646
See application file for complete search history.

(56) References Cited

U.S. PATENT DOCUMENTS

| | | | |
|---|---|---|---|
| 3,865,568 A | 2/1975 | Kratzer | |
| 4,186,100 A | 1/1980 | Mott | |
| 5,250,182 A * | 10/1993 | Bento | C12F 3/10 210/651 |
| 7,829,680 B1 | 11/2010 | Sander et al. | |
| 8,076,391 B2 | 12/2011 | Roa-Espinosa | |
| 8,257,951 B2 | 9/2012 | Prevost et al. | |
| 9,051,538 B1 | 6/2015 | Roa-Espinosa | |
| 9,066,531 B2 | 6/2015 | Williams | |
| 9,249,039 B1 | 2/2016 | Roa-Espinosa | |
| 9,371,356 B2 | 6/2016 | Roa-Espinosa | |
| 9,688,586 B1 | 6/2017 | Roa-Espinosa et al. | |
| 9,956,563 B1 | 5/2018 | Roa-Espinosa et al. | |
| 10,023,501 B2 | 7/2018 | Bisson et al. | |
| 10,093,891 B2 | 10/2018 | Kohl et al. | |
| RE47,268 E | 3/2019 | Roa-Espinosa | |
| 10,464,834 B2 | 11/2019 | Roa-Espinosa | |
| 10,465,152 B2 | 11/2019 | Bootsma | |
| 10,556,837 B2 | 2/2020 | Love et al. | |
| 10,889,528 B2 | 1/2021 | Love et al. | |
| 11,485,990 B2 | 11/2022 | Pohl et al. | |
| 2005/0153410 A1* | 7/2005 | Hallberg | C12M 21/04 426/635 |
| 2009/0215990 A1* | 8/2009 | Cheryan | C09B 61/00 422/187 |
| 2011/0049054 A1* | 3/2011 | Merryman | C02F 1/441 210/652 |
| 2011/0275845 A1* | 11/2011 | Woods | C12P 7/10 554/177 |
| 2012/0141644 A1* | 6/2012 | Cheryan | C11B 3/008 426/417 |
| 2012/0214198 A1 | 8/2012 | Trosch | |
| 2015/0191750 A1* | 7/2015 | Bleyer | C12P 7/06 435/71.1 |
| 2015/0305370 A1 | 10/2015 | Bleyer et al. | |
| 2017/0058300 A1* | 3/2017 | Aurandt | C12P 5/023 |
| 2017/0174577 A1 | 6/2017 | Blaney | |
| 2019/0185886 A1* | 6/2019 | Sarks | C12N 9/2411 |
| 2019/0211291 A1* | 7/2019 | Svetlichny | A23K 10/38 |
| 2019/0284649 A1* | 9/2019 | Jakel | C12P 7/06 |
| 2019/0390136 A1 | 12/2019 | Lee | |
| 2020/0207807 A1 | 7/2020 | Jakel | |
| 2021/0059277 A1* | 3/2021 | Lee | A23K 50/10 |
| 2021/0094888 A1 | 4/2021 | Love et al. | |
| 2021/0101845 A1 | 4/2021 | Love et al. | |

OTHER PUBLICATIONS

Fassbender, ThermoEnergy Ammonia Recovery Process for Municipal and Agricultural Wastes, TheScientificWorld (2001) 1(S2), pp. 908-913, Richland, Washington.

Kinidi et al., Recent Development in Ammonia Stripping Process for Industrial Wastewater Treatment, International Journal of Chemical Engineering, vol. 2018, Article ID 3181087, pp. 1-14, Sarawak, Malaysia.

EPA, Wastewater Technology Fact Sheet Ammonia Stripping, EPA 832-F-00-019, Sep. 2000, 4 pages, Washington, D.C.

Brennan et al., Recovery of viable ammonia-nitrogen products from agricultural slaughterhouse wastewater by membrane conductors: a review, The Royal Society of Chemistry Journal 2021, Environ. Sci.: Water Res. Technol., 2021, 7, pp. 259-273.

Ghyselbrecht et al., Stripping and scrubbing of ammonium using common fractionating columns to prove ammonium inhibition during anaerobic digestion, International Journal of Energy and Environmental Engineering (2018) 9, pp. 447-455.

Hjorth et al., Solid-liquid separation of animal slurry in theory and practice. A review, Agron. Sustain. Dev. 30 (2010), pp. 153-180.

Camilleri-Rumbau et al., Treatment of Manure and Digestate Liquid Fractions Using Membranes: Opportunities and Challenges, International Journal of Environmental Research and Public Health 2021, 18, 3107, pp. 1-30.

Fangueiro et al., Acidification of animal slurry—a review, J Environ Manage, Feb. 1, 2015; 149; 46-56, 2 pages.

Written Opinion of the International Searching Authority dated Jun. 2, 2022.

Rodrigues Reis et al., "New technologies in value addition to the thin stillage from corn-to-ethanol process", Reviews in Environmental Science and Biotechnology, vol. 16, No. 1, Feb. 7, 2017; pp. 175-206.

Supplementary European Search Report for the corresponding European Application No. 22746661, Date of Mailing: Jan. 27, 2025; 13 pages.

\* cited by examiner

METHOD TO PRODUCE HIGH PROTEIN RESIDUALS

CROSS-REFERENCE TO RELATED APPLICATIONS

This application claims priority to and the benefit of U.S. Provisional Application No. 63/142,555, filed on Jan. 28, 2021. The entire disclosure of the above application is incorporated herein by reference.

FIELD

The present disclosure relates to a method of treating distillation byproducts, and more specifically, to a method of treating stillage.

BACKGROUND

The statements in this section merely provide background information related to the present disclosure and may not constitute prior art.

Ethanol plants are known for the production of starch-based ethanol through fermentation, which creates a waste stream or byproduct referred to as whole stillage. Ethanol production using a dry milling process typically includes grinding dried whole corn into meal or powder and mixing the meal with water to create a slurry. The slurry is heated via a steam jet cooker to increase the amount of available soluble starch. During heating, amylose and amylopectin leach out from the starch granules. Typically, a commercial enzyme, such as alpha amylase, is used to target the amylose and amylopectin thereby breaking down the starch into shorter glucose chains. The slurry then goes into a saccharification and fermentation step in which glucoamylase enzymes hydrolyze the starch and yeast converts the glucose to ethanol and carbon dioxide ($CO_2$). Next, in a distillation step, the slurry is pumped into distillation columns where the ethanol is separated from the slurry thereby creating the byproduct or whole stillage. The byproduct or whole stillage is composed of liquids (mostly water and remaining ethanol) and corn or other grain solids. A centrifuge or screen is commonly used to separate much of the liquid (also known as thin stillage) from the solids (also known as wet cake).

A known process for handling stillage, currently used in typical ethanol plants, has whole stillage flow from a distillation column to a solid bowl decanter centrifuge that separates the feed stream according to density into cake (the "heavier" substances) and thin stillage (the "lighter" substances). The thin stillage typically has 7-10% total solids (TS) of which about 50-70% are suspended or insoluble solids, the remainder being dissolved solids including proteins, acids, unreacted sugars, and other soluble materials. The suspended solids in the thin stillage are predominately fines, but there is not a sharp particle size cutoff since some larger particles are subject to carry-over with the liquid.

Thin stillage is typically accumulated in a holding tank, from which typically 30-60% is recirculated as "backset" to the cooking and fermentation stages to provide nutrients and to reduce freshwater requirements. The remainder of the thin stillage is sent to the evaporator which concentrates the solids to a syrup of typically 30-35% TS.

There is a continuing need for a process for treating stillage, which results in a more efficient recovery of distillation by-products, improves plant efficiency, and creates higher value co-products.

SUMMARY

In concordance with the instant disclosure, a process for treating stillage, which results in a more efficient recovery of distillation by-products, has been surprisingly discovered.

In one embodiment, a method for treating whole stillage includes separating the whole stillage into a wet cake portion and a thin stillage portion and filtering the thin stillage portion into a primary concentrate and a primary permeate using a primary filtration system.

In one example, the step of separating the whole stillage into the wet cake portion and the thin stillage portion can include employing a member selected from a group consisting of a centrifuge, a vibrating screen, a paddle screen, a pressure screen, a dissolved air flotation system, and combinations thereof.

In other examples, the thin stillage portion in the filtering step can be at a temperature between about 50 degrees Celsius and about 100 degrees Celsius. The primary filtration system can include a membrane constructed of a material selected from a group consisting of metal, ceramic, and combinations thereof, the membrane can be configured to maintain filtration effectiveness at temperatures up to 100 degrees Celsius.

In other various examples, the primary filtration system can include a membrane constructed of stainless steel including a coating of titanium dioxide. The step of filtering the thin stillage portion into a primary concentrate and a primary permeate using a primary filtration system can include employing a member selected from a group consisting of a microfiltration process, an ultrafiltration process, a tight ultrafiltration process, a nanofiltration process, and a reverse osmosis process. The primary filtration system can include a membrane pore size of about 0.1 microns to 0.02 microns. The method can further include a step of subjecting the primary concentrate to a corn oil recovery process to recover corn oil therefrom.

In other examples, the method can further include a step of filtering the primary permeate into a secondary concentrate and a secondary permeate using a secondary filtration system. The secondary filtration system can include a tight ultrafiltration membrane with an average membrane pore size of about 1 kilodaltons (kDa) or a nanofiltration membrane with an average membrane pore size of about 100 to 500 daltons. The method can further include a step of processing the secondary permeate using a water reclamation system to form water and light syrup using one of a forward osmosis process and a reverses osmosis process.

In other examples, the method can further include a step of adding an additive to the primary permeate to precipitate a phosphate compound. The additive can include a member selected from a group consisting of: a source of ammonium ion, a source of magnesium ion, a source of potassium ion, a source of hydroxide ion, and combinations thereof. The additive can include a source of ammonium ion and a source of magnesium ion, and the phosphate compound includes struvite. The additive can include a source of magnesium ion and a source of hydroxide ion, and the phosphate compound includes potassium struvite. The method can further include a step of collecting the phosphate compound, and/or a step of making a fertilizer product using the collected phosphate compound.

In another example, the method can further include a step of subjecting the primary concentrate to a corn oil recovery process. The corn oil recovery process can include a member selected from a group consisting of an evaporation process, a separation process, and combinations thereof, to thereby collect corn oil from the primary concentrate.

In another embodiment, a system for treating whole stillage includes a whole stillage reservoir, a separation system in fluid communication with the whole stillage reservoir, and a primary filtration system in fluid communication with the separation system. The separation system can be configured to separate the whole stillage into a wet cake portion and a thin stillage portion. The primary filtration system can be configured to filter the thin stillage portion into a primary concentration and a primary permeate.

In various examples, the separation system can include a member selected from a group consisting of a centrifuge, a vibrating screen, a paddle screen, a pressure screen, a dissolved air flotation system, and combinations thereof. The primary filtration system can include a membrane constructed of a material selected from a group consisting of metal, ceramic, and combinations thereof, the membrane configured to maintain filtration effectiveness at temperatures up to 100 degrees Celsius.

In various examples, the primary filtration system can include a membrane constructed of stainless steel including a coating of titanium dioxide. The primary filtration system can include a member selected from a group consisting of a microfiltration system, an ultrafiltration system, a tight ultrafiltration system, a nanofiltration system, and a reverse osmosis system. The primary filtration system can include a membrane pore size of about 0.1 to 0.02 microns.

In other examples, the system can further include a secondary filtration system in fluid communication with the primary permeate, the secondary filtration configured to filter the primary permeate into a secondary concentrate and a secondary permeate. The secondary filtration system can include a tight ultrafiltration system that includes a membrane pore size of about 1 kDa or a nanofiltration system that includes a membrane pore size of about 100 to 500 daltons. The system can further include a water reclamation system in fluid communication with the secondary permeate, the water reclamation system configured to form water and light syrup using one of a forward osmosis process and a reverses osmosis process.

In other examples, the system can further include an additive reservoir fluidly coupled to the primary permeate, the additive reservoir including an additive to precipitate a phosphate compound from the primary permeate. The additive includes a member selected from a group consisting of a source of ammonium ion, a source of magnesium ion, a source of potassium ion, a source of hydroxide ion, and combinations thereof.

In other examples, the system can further include a corn oil recovery system in fluid communication with the primary concentrate, the corn oil recovery system configured to collect corn oil from the primary concentrate. The corn oil recovery system can include a member selected from a group consisting of an evaporation process, a separation process, and combinations thereof.

In another example, the system can further include a dehydration system in fluid communication with the wet cake portion and the primary concentrate, the dehydration system configured to remove water from the wet cake portion and primary concentrate and dry the wet cake portion and primary concentrate to produce high protein animal feed.

In another embodiment, a method for manufacturing high protein animal feed product includes separating the whole stillage into a wet cake portion and a thin stillage portion, filtering the thin stillage portion into a primary concentrate and a primary permeate using a primary filtration system, and dehydrating the primary concentrate and the wet cake portion.

In one example, the step of dehydrating the primary concentrate and the wet cake portion can include drying the wet cake portion via a drying system, concentrating the primary concentrate by evaporating off water via an evaporating system, and drying the primary concentrate via the drying system. The primary concentrate and the wet cake portion can be dried simultaneously or separately.

In another embodiment, a method for treating whole stillage includes separating the whole stillage into a wet cake portion and a thin stillage portion, separating the thin stillage portion into a primary concentrate and a primary permeate, and then further purifying the primary permeate using another membrane filtration process at approximately 1 kilodalton in molecular weight cutoff.

In one example, the step of separating the whole stillage can include use of at least one of a centrifuge, a vibrating screen, a paddle screen, a pressure screen, and a dissolved air flotation system.

In other examples, the step of separating the thin stillage portion can include the use of at least one of a microfiltration process, an ultrafiltration process, a nanofiltration process, a forward osmosis process, and a reverse osmosis process. The secondary filtration process can include nanofiltration at approximately 100-500 daltons in molecular weight cutoff.

In other various examples, the method can include a step of performing a reverse osmosis process on the primary or secondary permeate, a step of feeding the primary concentrate through a corn oil recovery process to remove corn oil from the primary concentrate, a water reclamation process configured to remove water from the primary or secondary permeate to produce at least one of light syrup and water, and/or a step of adding a chemical to precipitate minerals from the primary or secondary permeate, wherein the chemical can include a salt containing magnesium (such as magnesium chloride or magnesium oxide), a salt containing ammonium (such as ammonium chloride, ammonium oxide), a salt containing potassium (such as potassium chloride) and Sodium Hydroxide (NaOH), also known as caustic soda.

In another embodiment, a system for treating whole stillage includes a whole stillage tank, a separation system in fluid communication with the whole stillage tank, a primary filtration system in fluid communication with the separation system, a secondary tighter filtration system in fluid communication with the primary filtration system, and a water reclamation system in fluid communication with the tight filtration system. The separation system can be configured to separate the whole stillage into a wet cake portion and a thin stillage portion. The primary filtration system can be configured to separate the thin stillage into a primary concentrate and a primary permeate. The secondary filtration system can be configured to remove molecules from the primary permeate that are larger than approximately 1 kilodalton. The water reclamation system can be configured to remove water from the primary or secondary permeate using reverse osmosis membranes.

In various examples, the separation system can include at least one of a centrifuge, a vibrating screen, a paddle screen, a pressure screen, and a dissolved air flotation system. The primary filtration system can include at least one of a microfiltration system, an ultrafiltration system, a nanofiltration system, and a reverse osmosis system. The secondary filtration system can include at least one of an ultrafiltration system, a nanofiltration system, and a reverse osmosis system. The tight ultrafiltration system can include a tight ultrafiltration membrane at 1 kilodalton in molecular weight cutoff. The water reclamation system can include the tight ultrafiltration system and a reverse osmosis system.

In another embodiment, a method for manufacturing a fertilizer product includes the steps of forming phosphorus and magnesium containing precipitates by providing wastewater that contains phosphate, removing suspended solids from the wastewater to obtain thin stillage, feeding the thin stillage into a primary filtration system to obtain a primary permeate, and adding a chemical to the primary permeate to increase the pH level of the primary permeate and decrease the solubility of dissolved minerals. A second or third chemical may be added to increase the concentration of specific minerals, such as magnesium, ammonium, or potassium. The dissolved minerals can include magnesium, potassium, ammonium, and phosphate. The method further includes removing the dissolved minerals as a precipitate, whereby the fertilizer product is manufactured. The fertilizer product may be dehydrated to varying degrees, granulated, and otherwise packaged for shipment, delivery, and ideal land application.

In various examples, the chemical being added can include a source of ammonium ions (e.g., ammonia) to form magnesium ammonium phosphate, the chemical being added can include potassium to form magnesium potassium phosphate, and the chemical being added can include magnesium oxide or magnesium chloride along with caustic soda to form magnesium potassium phosphate.

A fertilizer product manufactured according to the teaches of the present disclosure is provided.

Further areas of applicability will become apparent from the description provided herein. The description and specific examples in this summary are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
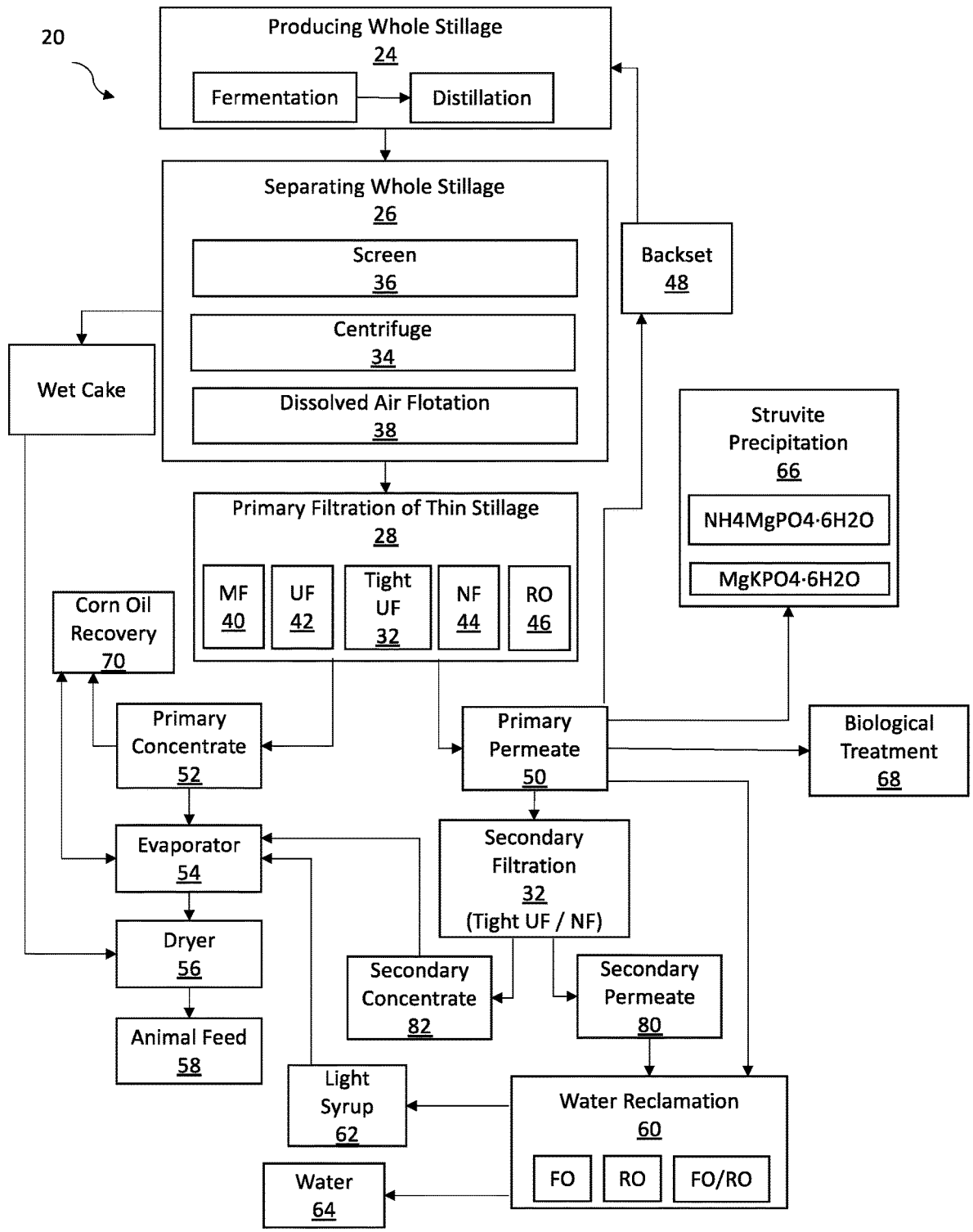
FIG. 1 is a schematic diagram illustrating a first method of treating stillage according to the present disclosure.

The following description of technology is merely exemplary in nature of the subject matter, manufacture, and use of one or more inventions, and is not intended to limit the scope, application, or uses of any specific invention claimed in this application or in such other applications as can be filed claiming priority to this application, or patents issuing therefrom. Regarding methods disclosed, the order of the steps presented is exemplary in nature, and thus, the order of the steps can be different in various embodiments, including where certain steps can be simultaneously performed.

The terms "a" and "an" as used herein indicate "at least one" of the item is present; a plurality of such items can be present, when possible. Except where otherwise expressly indicated, all numerical quantities in this description are to be understood as modified by the word "about" and all geometric and spatial descriptors are to be understood as modified by the word "substantially" in describing the broadest scope of the technology. The term "about" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that can arise from ordinary methods of measuring or using such parameters.

Although the open-ended term "comprising," as a synonym of non-restrictive terms such as including, containing, or having, is used herein to describe and claim embodiments of the present technology, embodiments can alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application.

Disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter can define endpoints for a range of values that can be claimed for the parameter. For example, if Parameter X is exemplified herein to have value A and also exemplified to have value Z, it is envisioned that Parameter X can have a range of values from about A to about Z. Similarly, it is envisioned that disclosure of two or more ranges of values for a parameter (whether such ranges are nested, overlapping, or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X can have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it can be directly on, engaged, connected, or coupled to the other element or layer, or intervening elements or layers can be present. In contrast, when an element is referred to as being "directly on," "directly engaged to," "directly connected to" or "directly coupled to" another element or layer, there can be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. can be used herein to describe various elements, components, regions, layers and/or sections, these elements, components, regions, layers and/or sections should not be limited by these terms. These terms can be only used to distinguish one element, component, region, layer or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath," "below," "lower," "above," "upper," and the like, can be used herein for ease of description to describe one element or feature's relationship to another element(s) or feature(s) as illustrated in the figures. Spatially relative terms can be intended to encompass different orientations of the device in use or operation in addition to the orientation depicted in the figures. For example, if the device in the figures is turned over, elements described as "below", or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

The present disclosure provides systems and methods for treating post fermentation stillage and producing products from post fermentation stillage. For example, ethanol plants produce starch-based ethanol through fermentation, which creates a waste stream or byproduct commonly referred to as "whole stillage." During the ethanol production process, dry-milled corn is treated with enzymes to hydrolyze starches to shorter saccharides, which are broken down into monomeric sugars. Fermentation of the sugars is accomplished by yeast or other suitable bacteria or microorganisms. After fermentation, the resulting fermentation broth containing ethanol undergoes a distillation step to recover the ethanol, which can be dehydrated to remove residual water. The remaining byproduct or whole stillage can be treated to recover residual oil, produce products and/or used as backset. Advantageously, the methods for treating post fermentation stillage described herein can produce higher protein dried feed materials, provide greater efficiency of corn oil recovery, improve facility yields (e.g., increased fermentation capacity utilizing the same tanks, increased production of ethanol, etc.), reduce energy use during dehydration, produce phosphorus containing fertilizer products, and/or reduce contamination during fermentation.

It should be appreciated that the methods provided in the present disclosure are not limited to treating post fermentation stillage from ethanol production and that the teachings of the present disclosure can be employed to treat other organic wastes and process streams. Nonlimiting examples include stillage from distilleries, stillage from faculties producing other alcohols and similar fermentation products (e.g., isobutanol), converting manure, digestate, food and beverage manufacturing wastes, and other high strength wastewaters into clean water, concentrated co-products, and/or renewable energy. The present methods can also employ post fermentation stillage in combination with other organic wastes and process streams.

Figure 3:
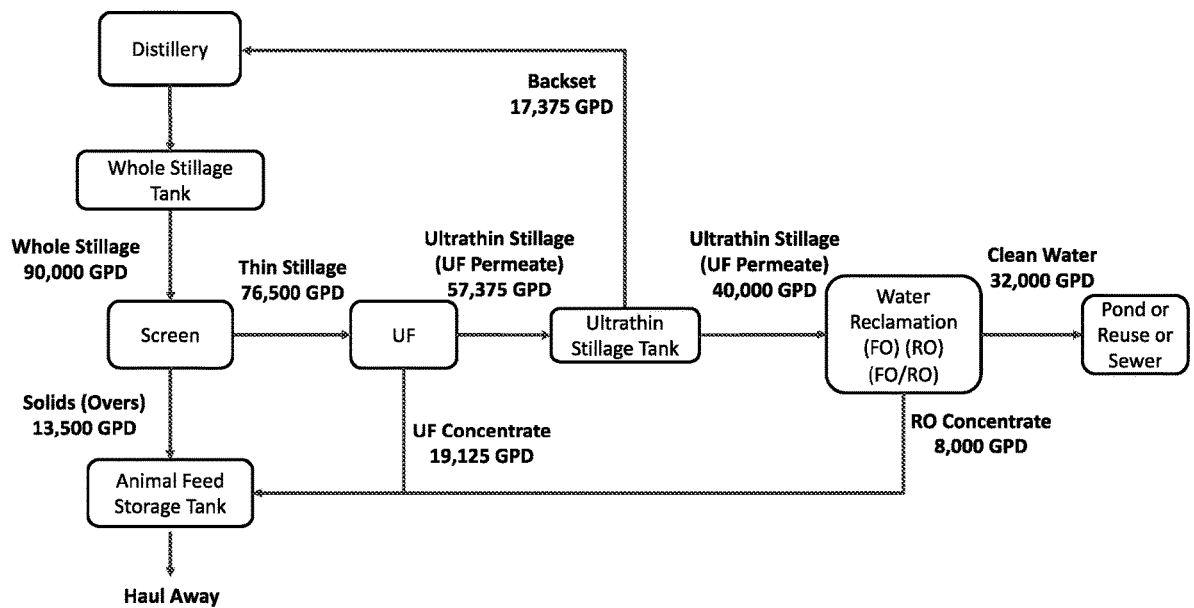
FIG. 3 is a schematic diagram illustrating a third method of treating stillage, according to the present disclosure.
Figure 4:
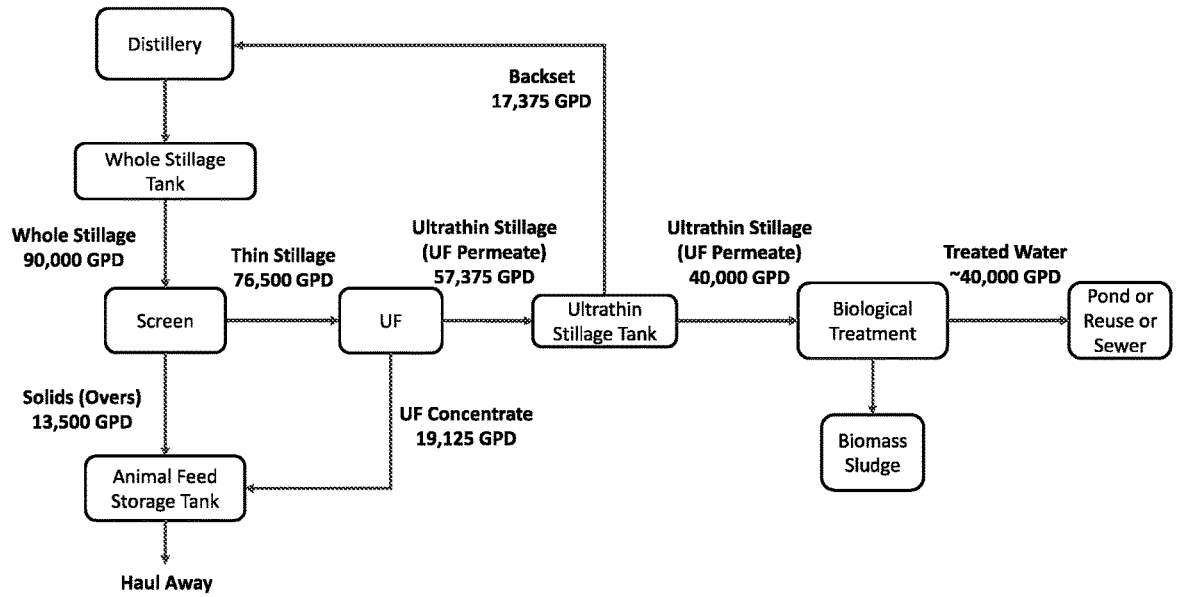
FIG. 4 is a schematic diagram illustrating a fourth method of treating stillage, according to the present disclosure.
Figure 5:
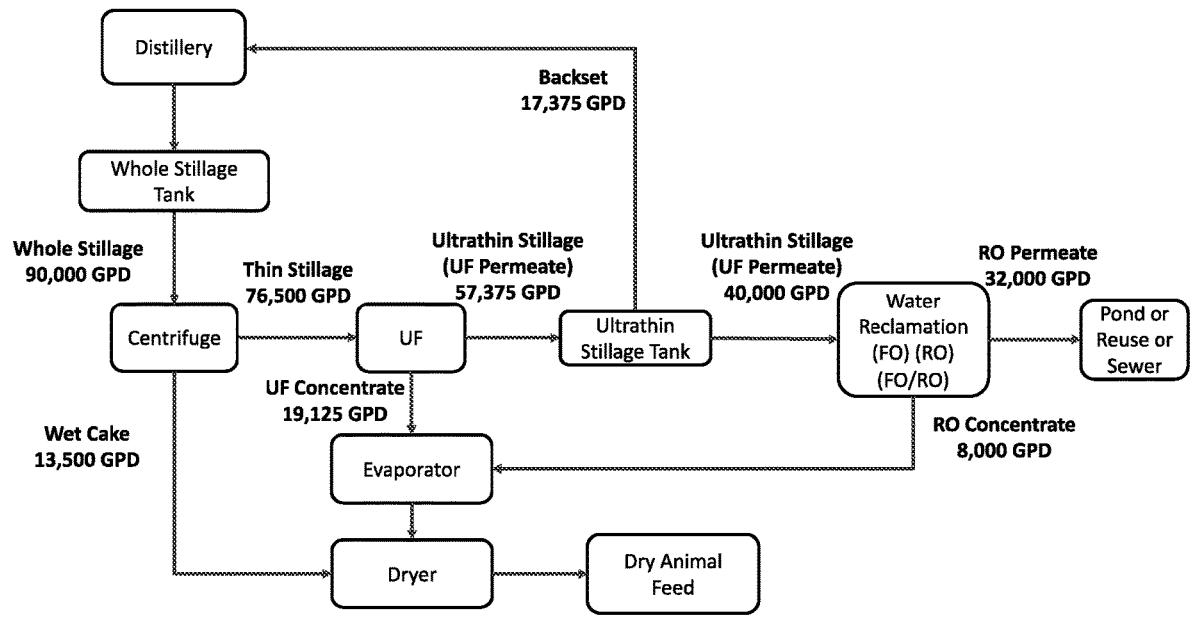
FIG. 5 is a schematic diagram illustrating a fifth method of treating stillage, according to the present disclosure.

Referring to FIG. 1, a method 20 for treating stillage, such as whole stillage and/or thin stillage is shown. The method 20 can include producing or obtaining whole stillage at step 24, separating the whole stillage into a wet cake portion and a thin stillage portion at step 26, a primary filtration step 28 to remove suspended solids from the thin stillage, and a secondary filtration step 29. At step 24, the whole stillage can be a byproduct of a distillation process post fermentation and stored in a waste tank or whole stillage tank. For example, the whole stillage can be produced/obtained from a corn-based ethanol production process as previously described. The whole stillage includes solid and liquid effluents remaining at a bottom of a distillation column after ethanol distillation. The whole stillage can be transferred to the whole stillage tank (FIGS. 2-4) for further treatment and processing.

At step 26, the solid and liquid effluents of the whole stillage are separated into an insoluble solid stream called "wet cake" and a thin stillage stream by removing large solids from the whole stillage. The separation step 26 can include subjecting the whole stillage to a separating system, such as for example, a centrifuge 34, a screen 36 (e.g., a vibrating screen, a paddle screen, a pressure screen, etc.), and/or a dissolved air flotation system 38, to separate the whole stillage into wet cake and thin stillage. However, it should be appreciated that a skilled artisan may employ any separation system or method known in the art suitable for separating the whole stillage.

In one embodiment, the separation step 26 can include centrifugation of the whole stillage. That is, the whole stillage can be subjected to a decanter centrifuge 34, in which the whole stillage can be pumped from the whole stillage tank into the decanter centrifuge 34. The centrifuge 34 rotates at high speeds generating centrifugal forces causing particles with different densities to separate. The solid particles with higher density can be transferred to a wet cake storage tank and the thin stillage can be transferred to a thin stillage tank or processing system.

In another embodiment, the separation step 26 can include filtering the whole stillage via a screen 36. That is, the whole stillage can be subjected to a vibrating screen, a paddle screen, and/or a pressure screen configured to separate suspended solids from the thin stillage. The screen 36 can be manufactured from stainless steel. The screen 36 can include openings that are sized to achieve the desired filtration. A nonlimiting example includes a vibrating screen having screen openings configured to remove solids larger than 864 microns. It should be appreciated that a skilled artisan may scale the size of the screen openings, as desired.

In certain embodiments, the separation step 26 can include both centrifuging and filtering the whole stillage. That is, the separation system can include the screen and the centrifuge. As such, the whole stillage can be subjected to the screen 36 in conjunction with the centrifuge 34. For example, a vibrating screen can be disposed before the centrifuge acting as an initial screening thereby reducing a total load on the centrifuge 34. Advantageously, the reduction in the total load on the centrifuge 34 allows the centrifuge 34 to be more efficient and economical.

In another embodiment, the separation step 26 can include subjecting the whole stillage to a dissolved air flotation (DAF) system 38 to remove the suspended solids from the thin stillage. The DAF system 38 dissolves air in water under pressure forming micro bubbles that attach to the suspended solids causing the suspended solids to float to the surface. A polymer can be used to enhance coagulation/flocculation of the suspended solids as well and promote enhanced flotation. Once the solids float to the surface, a skimmer can be used to remove the floating solids. It should be appreciated that a skilled artisan may employ other flotation mediums, such as nitrogen gas, to create bubbles depending on the application. Furthermore, it should be appreciated that a skilled artisan can utilize the DAF system 38 alone or in conjunction with other separation processes known in the art, as desired.

During the separation step 26, as the whole stillage is separated into wet cake and thin stillage, the wet cake and thin stillage exit the separation system and are transferred to different tanks or systems, such as for example, a storage tank or a primary filtration system. In one example, the wet cake exits the separation system and can be transferred to a animal feed tank, where it can be hauled away and sold as animal feed.

With reference to FIG. 1, at step 28, the thin stillage can be pumped from the separation system to a primary filtration system where the thin stillage undergoes one or more membrane filtration processes to remove suspended solids from the thin stillage. The suspended and dissolved solids in the thin stillage can include, but are not limited to, nitrogen, phosphorus, potassium, oil, sulfur, calcium, magnesium, secondary nutrients, micro-nutrients and organic matter found in organic waste. The primary filtration system can include one or more membrane filtration systems configured to remove the suspended solids from the thin stillage. Nonlimiting examples of filtration systems include a microfiltration system 40, an ultrafiltration system 42, a tight ultrafiltration system 32, a nanofiltration system 44, and a reverse osmosis (RO) system 46. A skilled artisan may select other suitable filtration systems, as desired. It should be appreciated that the number of filtration systems employed can depend on processing conditions and characteristics of the material or substance being treated.

Separation by microfiltration, ultrafiltration, tight ultrafiltration, nanofiltration, and RO can depend on the molecular weight cut-off (MWCO) of the membrane and the molecular weight of the suspended solids. MWCO calculates pore size and retention capabilities of membranes. In these filtration systems, water and/or low molecular weight substances pass through pores of membranes thereby separating and removing the suspended solids from the thin stillage. For example, with microfiltration 40, the MWCO of the membrane can be greater than the MWCO of membranes utilized in ultrafiltration 42, tight ultrafiltration 32, nanofiltration 44, and RO 46. With ultrafiltration 42, the MWCO of the membrane can be greater than the MWCO of membranes utilized in tight ultrafiltration 32, nanofiltration 44 and RO 46. With tight ultrafiltration 32, the MWCO of the membrane can be greater than the MWCO of membranes utilized in nanofiltration 44 and RO 46. In nanofiltration 44, the MWCO of the membrane can be greater than the MWCO of membranes utilized in RO 46.

The membrane of the microfiltration 40 and ultrafiltration 42 can be made of stainless steel or ceramic to allow filtration of the thin stillage while the material is hot. For example, the membranes for ultrafiltration 42 can include porous stainless-steel tubular membranes with internal titanium dioxide coating for abrasion resistance. Advantageously, these stainless-steel membranes have greater tolerances for handling high temperatures, high solids, high viscosities, and extreme pH levels.

With continued reference to FIG. 1, during the primary filtration step 28, the thin stillage is separated, based on molecular weight, into a primary concentrate 52 and a primary permeate 50 (also known as ultrathin stillage). In certain embodiments, the thin stillage can be separated into high protein streams and low protein streams. The primary filtration membrane can process the thin stillage hot (150-212° F.) or the thin stillage can be heated during the primary filtration process. The primary permeate 50 can be transferred to a primary permeate tank. Primary filtration system can include membranes ranging in size to separate high molecular weight substrates (primary concentrate) from low molecular weight substrates (primary permeate). For example, the microfiltration membrane can have an average pore size around 0.1 microns and the ultrafiltration membrane can have an average pore size around 0.02 microns.

It should be understood that the primary filtration step 30 is not limited to a single filtration process and that a skilled artisan can employ multiple filtration processes for the primary filtration step 30, as desired.

The primary permeate 50 can include almost no suspended solids, and thus, be significantly more clarified than the thin stillage. Advantageously, the primary permeate 50 can be used as backset 48, as opposed to thin stillage, since the primary permeate 50 contains fewer suspended solids, almost no oils or bacteria, and fewer volatile acids.

When thin stillage is used as backset 48, the suspended solids in the backset 48 can limit the amount of new corn that can be added during the slurry process. The suspended solids in thin stillage can include non-fermentable solids, which do not readily ferment into ethanol but still contribute to the total solids in the fermenter, thereby limiting the amount of new corn solids that can be added and limiting overall ethanol production efficiency for the same size equipment. The suspended solids in thin stillage can also include fermentation inhibitors, such as glycerol or organic acids thereby slowing fermentation and thus decreasing output. Thin stillage can also contain bacteria and organisms that adversely affect ethanol fermentation yields and require the use of anti-microbials in the fermentation process. Additionally, suspended solids in backset 48 can interfere with nutrient balances during fermentation.

In contrast, since the primary permeate 50 has substantially fewer total solids and fewer total suspended solids compared to conventional thin stillage, using the primary permeate 50 as backset 48 can increase loading of new fermentable solids (e.g., corn) and increase facility yields (e.g., ethanol and higher protein dried feed products). Additionally, since the primary permeate 50 is substantially free of microorganisms, using the primary permeate 50 as backset 48 can also reduce contamination in the fermenters (which can help improve yield) as well as reduce the need to use antibiotics and other antimicrobial measures in the fermenting process.

In one particular embodiment, the method 20 can further include manufacturing high protein animal feed using the primary concentrate 52. The method includes separating the whole stillage into the wet cake portion and the thin stillage portion, filtering the thin stillage portion into the primary concentrate and primary permeate using the primary filtration system, and dehydrating the primary concentrate 52 and the wet cake. The dehydration step can include an evaporating system 54 and a drying system 56. The wet cake can be fed into the drying system 56 to remove moisture. The primary concentrate can be fed into the evaporating system 54 where additional water is evaporated. Next, the primary concentrate can be fed into the drying system 56 to be combined with the wet cake before the wet cake undergoes the drying process such that the primary concentrate and the wet cake undergoes the drying process together to produce the high protein animal feed product. In other words, the primary concentrate and the wet cake can be dried by the drying system 56 simultaneously.

Alternatively, during the step of manufacturing high protein animal feed, the wet cake can be fed into the drying system 56 and undergo the drying process before the primary concentrate is added. In one example, the wet cake can be subjected to a series of dyers before the primary concentrate is mixed in. For example, the wet cake can be fed into a drying system 56 that include four dryers, wherein the wet cake is fed through each dryer sequentially. However, the primary concentrate may not be mixed with the wet cake until the wet cake reaches the second, third, or fourth dryer. In another example, the primary concentrate could be mixed with the wet cake in steps, e.g., half of the primary concentrate can be mixed with the wet cake in the third dryer and the remaining half can be mixed in the fourth dryer.

Advantageously, using the primary concentrate, as opposed to the conventional thin stillage, to manufacture the high protein animal feed requires less water removal, thereby reducing the energy consumption during the dehydration processes. Additionally, since the primary concentrate 52 contains more protein compared to conventional thin stillage, a dried primary concentrate product can have substantially more protein compared to a dried thin stillage product. For example, it has been discovered that the dried primary concentrate product having 90% dry matter can yield 33% more material each day, wherein the material includes 21% more protein (28% vs. 24% protein using 5.65× total Kjeldahl nitrogen (TKN) as a conversion factor for estimating) compared to the dried thin stillage product.

As shown in FIG. 1, the method 20 can further include a corn oil recovery process at step 70, in which the primary concentrate 52 or partially evaporated primary concentrate from the evaporator 54 flows through. It has been discovered that during the primary filtration process, corn oil does not pass through the membrane of the filtration system being utilized. In certain embodiments, the primary filtration process can include cross flow filtration configured to permit the thin stillage to flow tangentially across a surface of the primary filtration membrane. As the thin stillage flows across the surface, primary permeate 50 passes through while the corn oil remains in the primary concentrate 52.

With that, the primary concentrate 52 can include all the corn oil from the thin stillage. At a typical permeate recovery of about 50%, the concentration of corn oil in the primary concentrate 52 doubles. For example, if 100 gallons of thin stillage is fed through the primary UF membrane, yielding 50 gallons of primary concentrate 52, all the corn oil from the thin stillage can remain in the 50 gallons of primary concentrate 52. Since the concentration of corn oil in the primary concentrate stream starts at a higher level, e.g., approximately doubled, extraction of the corn oil is easier. In certain embodiments, the corn oil recovery process can include feeding the primary concentrate 52 enriched with corn oil through an evaporator and an additional separation process, such as centrifuging, that can use demulsifiers to facilitate extraction the corn oil. Accordingly, the corn oil recovery process utilizing the primary concentrate 52 can result in a greater yield of corn oil compared to the known corn oil recovery processes utilizing thin stillage.

In certain embodiments, as shown in FIG. 1, the method 20 can include a secondary filtration step 29, subsequent the primary filtration step 28. With secondary filtration, the primary permeate produced in the primary process is fed into a secondary filtration system configured to further separate the primary permeate 50 into a secondary permeate 80 and secondary concentrate 82. The primary permeate is separated based on molecular weight and ionic charge, which is described in greater detail below. In one example, the primary permeate 50 is fed through a tight UF process with a membrane that has a MWCO of approximately 1 kDa. In another nonlimiting example, the primary permeate 50 is fed through a nanofiltration membrane having a MWCO ranging between approximately 100 daltons (Da) to approximately 500 Da. It should be appreciated that a skilled artisan may scale the secondary filtration membrane to any suitable MWCO and/or pore size depending on the application, molecular weight, ionic charge, or any other characteristic of the particles/molecules being separated.

Figure 2:
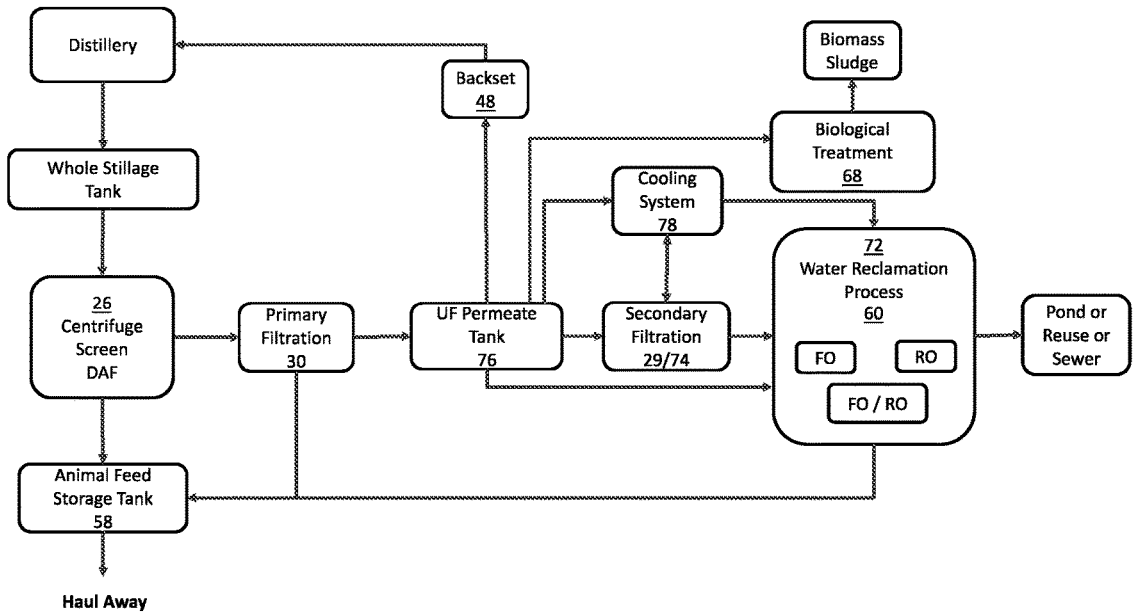
FIG. 2 is a schematic diagram illustrating a second method of treating stillage, according to the present disclosure.

Referring to FIGS. 1-2, the method 20, at step 60, can further include dewatering the primary permeate and/or the secondary permeate via a water reclamation system 72. As such, the water reclamation system 72 can be in communication with the primary filtration system and/or secondary filtration system. The water reclamation system 72 can be configured to receive the primary and/or secondary permeate from the primary and/or secondary filtration system. In one embodiment, the water reclamation system 72 can be configured to remove water from the primary/secondary permeate, and thus produce light syrup 62 and/or water 64.

It should be appreciated that the water reclamation system 72 of the present disclosure can be configured to perform at least one of a reverse osmosis process and a forward osmosis process. Reverse osmosis is a water purification process that uses a partially permeable membrane to remove ions, unwanted molecules and larger particles from water. Forward osmosis is an osmotic process that, like reverse osmosis, uses a semi-permeable membrane to separate water from dissolved solutes. The driving force for this separation is an osmotic pressure gradient, such that a "draw" solution of high concentration (relative to that of the feed solution), is used to induce a net flow of water through the membrane into the draw solution, thus effectively separating the water from the solutes. In reverse osmosis, an applied pressure is used to overcome osmotic pressure.

The water reclamation system 72 of the present disclosure may optionally perform a combination of the reverse osmosis process and the forward osmosis process. It should be appreciated that water reclaimed by the water reclamation system 72 can be discharged to a sewer, discharged to a water body, or recycled for reuse at the facility, such as in make-up water for fermentation, tank cleanouts, etc. A skilled artisan may utilize the reclaimed clean water in any suitable manner, as desired.

In one particular embodiment, as shown in FIG. 2, the water reclamation system 72 can be configured with both forward osmosis and the reverse osmosis processes. In this case, a forward osmosis system dewaters the primary permeate 50 from the primary permeate tank by putting water into the draw solution. A reverse osmosis system processes the draw solution to remove the water. It should also be appreciated that the forward osmosis process can be employed with a multitude of different strategies to regenerate the draw solution. Advantageously, water can be removed from primary permeate effluent being discharged through either forward osmosis or reverse osmosis. In one specific example, the primary permeate is transferred from the primary filtration system straight into the RO system.

The forward osmosis system may have a semi-permeable, thin film membrane disposed therein. In operation, the forward osmosis system can be configured to receive the primary permeate on a first side of the membrane. A draw solution or osmotic agent can be disposed on an opposite side of the membrane. The draw solution can be sodium chloride (NaCl), magnesium chloride (MgCl$_2$), glycerol, or other or salt solutions, for example. Water may selectively pass through the membrane, thereby, increasing the concentration of primary permeate remaining on the first side of the membrane. The forward osmosis system may result in a more concentrated primary permeate. The draw solution, which becomes diluted with water, can be regenerated through use of reverse osmosis or other means known in the art, thereby liberating the clean water. In certain embodiments, 70-80% of the water in the primary permeate can be removed. In addition to forward osmosis, additional filtration system operations like nanofiltration can be used to condition the primary permeate prior to reverse osmosis.

The reverse osmosis system may also have a semipermeable, thin film membrane disposed therein. Water may selectively pass through the membrane. The reverse osmosis system may produce the syrup product and clean water. The primary permeate can also be evaporated to create a syrup and condensate. It should be appreciated that the clean water reclaimed during this process may then be recycled into the system. Additionally, the forward osmosis system and the reverse osmosis system can be repeatedly used by cycling the reclaimed water therethrough until a desired concentration is reached in the primary permeate.

In one embodiment, reverse osmosis can be used directly to dewater the primary/secondary permeate.

In another particular embodiment, as shown in FIG. 2, the water reclamation system 72 can be configured with the secondary filtration process and the reverse osmosis process. In this way, the secondary filtration process can replace the forward osmosis process as described above. The secondary filtration system 74 can be in communication with the primary permeate tank 76 and configured to receive the primary permeate from the primary permeate tank 76. In one embodiment, the secondary filtration system 74 can be configured to filter the primary permeate prior to concentration in the RO.

In a specific example, the water reclamation system 72 can be configured with the secondary filtration process, wherein the secondary filtration process includes an ultrafiltration (UF) membrane to remove particles larger than about 1 kDa. The primary permeate was processed through a repeat-batch reverse osmosis process to produce RO permeate (clean water) and RO concentrate. The UF concentrate and RO concentrate can be further dehydrated using evaporation to create protein rich animal feed ingredients. Additionally, the primary permeate can be recycled as backset to the ferment and the RO permeate can be used for fermenter make-up water.

The water reclamation system for dewatering the primary/secondary permeate, according to the methods of the present disclosure, can produce RO concentrate and RO permeate and/or FO concentrate and FO permeate. The RO/FO concentrate can be incorporated into dried animal feed products by evaporating and drying the RO/FO concentrate (FIG. 4) or adding it directly to mixed dry or liquid feeds (FIG. 2). The RO/FO concentrate can be combined with the primary concentrate product for dehydration, as well.

Referring to FIG. 2, since the RO/FO concentrate contains organics and fermentation by-products, such as glycerol, the RO/FO concentrate can also be used as a carbon source for biological wastewater treatment 68.

The system 20 can further include a cooling system 78 to cool the primary and/or secondary permeate. As discussed above, primary filtration membrane can process the thin stillage hot (150-212° F.) or the thin stillage can be heated during the primary filtration process. As such, the hot primary permeate can be fed through the cooling system 78 prior to feeding the primary permeate into the secondary filtration system 74 or the water reclamation system 60.

As shown in FIG. 1, the method 20 can include a step 66 of manufacturing phosphorus magnesium containing precipitates from the primary permeate via precipitation. During the primary filtration process, the thin stillage can be separated into a high protein stream and a low protein stream (primary permeate). One or more chemicals can be added to the primary permeate to precipitate low protein components. In one example, a source of ammonium ion (e.g., ammonia, ammonium chloride) and magnesium ion (magnesium chloride, magnesium oxide) can be added to the primary permeate causing its pH to increase and solubility of dissolved minerals to decrease thereby forming magnesium ammonium phosphate (NH4MgPO4.6H2O) or struvite. Next, the struvite can be removed from the primary permeate, dried, granulated, and used as a fertilizer product.

It was discovered that the primary permeate produced from whole or thin stillage contains more potassium than ammonium, along with ample amounts of phosphate. As such, potassium struvite or "K struvite" (KMgPO4.6H2O) can be precipitated with only the addition of a compound to raise the pH (e.g., caustic soda) and addition of a suitable amount of magnesium (e.g., magnesium chloride, magnesium oxide). Advantageously, removal of the suspended solids during the primary filtration process facilitates the precipitation of a pure fertilizer product.

In one example, a method 20 for producing K-struvite can include heating the primary permeate at a temperature around 170° F., adding Caustic soda (NaOH) to increase the pH of the primary permeate to approximately 8.5-9.0, and then adding MgCl$_2$.6H$_2$O powder at a 1.0 molar dosing ratio (MDR) (defined as the ratio of moles Mg$^{2+}$ dosed per mole PO4-P in the solution). K-struvite (MgKPO$_4$.6H$_2$O) precipitated from the solution and can be collected by gravity settling, centrifugation, hydrocyclone or similar means known to those skilled in the art. The conversion of phosphate to K-struvite can exceed 95%. Advantageously, the liquid remaining after precipitation of K-struvite can be returned as backset to the fermentation process, evaporated for incorporation into animal feeds, and/or further filtered to extract water and concentrate it. The primary concentrate is notably enriched in total nitrogen and can be further dehydrated for use as an animal feed.

The method 20 can include treating the primary permeate using anaerobic digestion to produce biogas. In one embodiment, the biogas can be combusted to produce energy. In another embodiment, the biogas can be compressed to use as Renewable Natural Gas (RNG). Other biological processes, including aerobic, anoxic, and anaerobic are envisioned. Treatment reactors can be configured as high-rate reactors with a low hydraulic residence time since the primary permeate will contain few if any suspended solids.

EXAMPLE 1

The data shown in TABLE 1 below was collected from UF filtration of thin stillage at a commercial ethanol facility using a sintered stainless steel tubular crossflow UF membrane (0.02 micron average pore size) with a titanium dioxide internal coating and 0.75" diameter membrane. Thin stillage, UF permeate, and UF concentrate were collected and analyzed. Mass balances were prepared according to the commercial flows of the ethanol facility. The ethanol plant produced 1,400 gallons per minute (GPM) of thin stillage (centrate from a decanter style centrifuge). The material had 7.3% total solids (TS) and contained 3,362 mg/L total Kjeldahl nitrogen (TKN). After UF at 50% UF permeate recovery, the plant produced 700 GPM of UF permeate at 4.9% TS and 700 GPM of UF concentrate at 9.6% TS.

TABLE 1

| Parameter | Units | Thin Stillage | UF Permeate | UF Concentrate |
|---|---|---|---|---|
| Total Solids | % | 7.3 | 4.9 | 9.6 |
| Total Kjeldahl Nitrogen (TKN) | mg/L | 3,362 | 1,330 | 5,393 |
| Phosphorus | mg/L | 1,567 | 1,477 | 1,657 |
| Potassium | mg/L | 2,089 | 2,113 | 2,064 |
| Oil (HEM) | mg/L | 14,000 | <100 | 28,000 |

TABLE 2 illustrates the pounds per day (on a dry weight basis) of each component in each process fluid (e.g., thin stillage, UF permeate, and UF concentrate) for the ethanol plant given the analyses shown in TABLE 1. As demonstrated, a majority of the nitrogen (which can be used to estimate the protein content) was found in the UF concentrate.

TABLE 2

| | Pounds Per Day | | |
|---|---|---|---|
| Parameter | Thin Stillage (1400 GPM) | UF Permeate (700 GPM) | UF Concentrate (700 GPM) |
| Total solids | 1,218,261 | 411,116 | 807,144 |
| Total Kjeldahl nitrogen (TKN) | 56,357 | 11,149 | 45,208 |
| Phosphorus | 26,265 | 12,378 | 13,887 |
| Potassium | 35,020 | 17,715 | 17,305 |

TABLE 3 illustrates a comparison of using 700 GPM thin stillage as backset versus using 700 GPM of UF permeate prepared according to the method of the present disclosure. The UF permeate can be reused as backset instead of the thin stillage, resulting in about 198,000 pounds per day fewer total solids being loaded into the fermenters from backset. Plant operators can increase the amount of new ground corn added to the fermenter by about 198,000 lbs/day (on a dry weight basis) to create a fermentation mixture with approximately the same total solids content as is typically used.

TABLE 3

| | Pounds Per Day | | | |
|---|---|---|---|---|
| Parameter | Thin Stillage (700 GPM) | UF Permeate (700 GPM) | Difference | Percent Difference |
| Total solids | 609,130 | 411,116 | 198,014 | 33% |
| Total Kjeldahl nitrogen (TKN) | 28,178 | 11,149 | 17,030 | 60% |
| Phosphorus | 13,133 | 12,378 | 754 | 6% |
| Potassium | 17,510 | 17,715 | −205 | −1% |

TABLE 4 illustrates a comparison of theoretical dried products having 90% total solids and 10% water that could be produced from dehydrating 700 GPM of thin stillage versus dehydrating 700 GPM of UF concentrate prepared according to the method of the present disclosure. The total yield of dried product is higher when dehydrating UF concentrate and the resulting product is richer in protein.

TABLE 4

| Parameter | Units | Dried Thin Stillage (700 GPM to dehydration) | Dried UF Concentrate (700 GPM to dehydration) | Percent Difference |
|---|---|---|---|---|
| Total weight | lbs/day | 676,812 | 896,827 | 33% |
| Total Kjeldahl nitrogen (TKN) | wt. % | 4.16% | 5.04% | 21% |
| Phosphorus | wt. % | 1.94% | 1.55% | −20% |
| Potassium | wt. % | 2.59% | 1.93% | −25% |

EXAMPLE 2

The data shown in TABLE 5 below was collected from UF filtration of thin stillage at a commercial ethanol facility using a sintered stainless membrane. Thin stillage, UF permeate, and UF concentrate were collected and analyzed using the Hexane Extractable Material (HEM) method. The results indicate that the UF membrane concentrated essentially all of the oil present in the UF concentrate, as no oil was detected in the UF permeate. By increasing the concentration of oil in the UF concentrate, subsequent removal efficiency (for example in a centrifuge) should be improved.

TABLE 5

| Parameter | Units | UF Feed (Thin Stillage) | UF Permeate | UF Concentrate |
|---|---|---|---|---|
| Hexane extractable material | mg/L | 14,000 | Non-Detect (<100) | 23,900 |

EXAMPLE 3

The data in TABLE 6 below was collected during filtration of the UF permeate and shows the effectiveness of membrane concentration. Whole stillage from a distillery was screened using a vibratory screen to create thin stillage. The thin stillage was filtered using a sintered stainless steel tubular crossflow UF membrane (0.02 micron average pore size) with a titanium dioxide internal coating and 0.75" diameter membrane. The UF permeate was collected in a tank, cooled to about 90° F., and concentrated using a forward osmosis membrane system. The draw solution was NaCl and continuously regenerated by a reverse osmosis system that discharged clean water

TABLE 6

| Parameter | Units | UF Permeate | FO Concentrate |
|---|---|---|---|
| Percent solids | % | 2.06 | 5.82 |
| Chemical oxygen demand (COD) | mg/L | 29,490 | 70,150 |
| Ammoniacal Nitrogen | mg/L | 13.1 | 30 |
| Organic nitrogen | mg/L | 505 | 1,270 |
| Total Kjeldahl nitrogen (TKN) | mg/L | 518 | 1,300 |
| Phosphorus (total) | mg/L | 616 | 1,680 |
| Potassium (total) | mg/L | 911 | 2,370 |
| Sulfur (total) | mg/L | 55.9 | 143 |
| Calcium (total) | mg/L | 53.4 | 128 |
| Magnesium (total) | mg/L | 237 | 651 |

EXAMPLE 4

The data in Table 7 below was collected during filtration of whole stillage at a distillery using a repeat batch reverse osmosis process. Whole stillage was collected and processed through a screw-press to remove suspended solids. The liquid pressate was then processed through an ultrafiltration (UF) membrane system to remove particles larger than about 1 kDa. The UF permeate was processed through a repeat-batch reverse osmosis (RO) process to produce RO permeate (clean water) and RO concentrate. The UF concentrate and RO concentrate can be further dehydrated using evaporation to create protein rich animal feed ingredients. Additionally, the UF permeate can be recycled as backset to the ferment and the RO permeate can be used for fermenter make-up water.

TABLE 7

| Parameter | Units | UF Feed | UF Permeate | UF Concentrate | RO Permeate | RO Concentrate |
|---|---|---|---|---|---|---|
| Percent solids | % | 1.35 | 1 | 2.75 | 0.01 | 5.57 |
| Chemical oxygen demand (COD) | mg/L | 21.520 | 14.770 | 41.180 | 780 | 78.690 |
| Ammoniacal Nitrogen | mg/L | 10.3 | 8.6 | 13.6 | n.d. | 37 |
| Organic nitrogen | mg/L | 481 | 111 | 879 | n.d. | 578 |
| Total Kjeldahl nitrogen (TKN) | mg/L | 491 | 120 | 893 | n.d. | 615 |
| Phosphorus | mg/L | 348 | 303 | 383 | 0.88 | 1.360 |
| Potassium | mg/L | 512 | 479 | 445 | 2.9 | 2.500 |
| Sulfur | mg/L | 58.3 | 29.8 | 150 | n.d. | 173 |
| Calcium | mg/L | 48.7 | 47.2 | 45 | 1.36 | 248 |
| Magnesium | mg/L | 151 | 138 | 141 | 0.55 | 676 |
| Sodium | mg/L | 21.6 | 20.9 | 18.7 | 0.47 | 148 |
| Iron | mg/L | 3.35 | 2.91 | 4.16 | 0.27 | 72.7 |
| Manganese | mg/L | 1.403 | 1.292 | 1.238 | 0.006 | 6.782 |
| Zinc | mg/L | 2.4 | 2.33 | 2.43 | 0.01 | 11.5 |
| Copper | mg/L | 0.58 | 0.25 | 1.25 | n.d. | 0.65 |
| Conductivity | mS/cm | 2.61 | 2.45 | 2.44 | 0.22 | 9.06 |
| pH | S.U, | 3.39 | 3.4 | 3.42 | 3.39 | 3.31 |

EXAMPLE 5

The data shown in TABLE 8 below was collected from UF filtration of thin stillage at a commercial ethanol facility. Thin stillage, UF permeate, and UF concentrate were collected and analyzed. The UF permeate had a temperature around 170° F. Caustic soda (NaOH) was dosed to increase the pH of the UF permeate to approximately 8.5-9.0, then $MgCl_2.6H_2O$ powder was added at a 1.0 molar dosing ratio (MDR) (defined as the ratio of moles $Mg^{2+}$ dosed per mole PO4-P in the solution). Potassium struvite (K-struvite, $MgKPO_4.6H_2O$) precipitated from the solution and was collected. The conversion of phosphate to K-struvite was greater than 95%. The liquid remaining after precipitation of K-struvite can be returned as backset to the fermentation process, evaporated for incorporation into animal feeds, and/or further filtered to extract water and concentrate it. The UF concentrate is notably enriched in total nitrogen and can be further dehydrated for use as an animal feed.

TABLE 8

| Parameter | Units | UF Feed (Thin Stillage) | UF Permeate | UF Concentrate |
|---|---|---|---|---|
| Percent solids | % | 5.8 | 3.57 | 20.2 |
| Total Kjeldahl nitrogen (TKN) | mg/L | 2,500 | 1,150 | 9,300 |
| Phosphorus | mg/L | 1,400 | 1,320 | 1,500 |
| Potassium | mg/L | 2,200 | 2,050 | 2,000 |

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments can be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions, and methods can be made within the scope of the present technology, with substantially similar results.

While certain representative embodiments and details have been shown for purposes of illustrating the present disclosure, it will be apparent to those skilled in the art that various changes may be made without departing from the scope of the disclosure, which is further described in the following appended claims.

What is claimed is:

1. A system for treating whole stillage comprising corn oil, the system comprising:
   a whole stillage reservoir;
   a separation system in fluid communication with the whole stillage reservoir and configured to separate the whole stillage into a wet cake portion and a thin stillage portion comprising the corn oil,
   wherein the separation system includes one or more of a screen; a centrifuge; and a dissolved air flotation (DAF) system;
   a primary filtration system in fluid communication with the separation system and configured to filter the thin stillage portion into a primary concentrate and a primary permeate, wherein the corn oil remains in the primary concentrate,
   wherein the primary filtration system includes a member selected from a group consisting of a microfiltration system or an ultrafiltration system,
   a fermenter fluidly coupled to the primary permeate obtained from the primary filtration system, wherein the primary permeate is configured for being recycled as backset to the fermenter;

a corn oil recovery system fluidly coupled to receive the primary concentrate obtained from the primary filtration system;

an evaporator fluidly coupled to receive the primary concentrate obtained from the primary filtration system and the corn oil recovery system, wherein:

the corn oil recovery system is located and configured to receive (i) the primary concentrate; or (ii) partially dewatered primary concentrate from the evaporator, the corn oil recovery system is configured to collect corn oil from the primary concentrate or the partially dewatered primary concentrate, and the evaporator is located and configured to receive the primary concentrate and remove water from the primary concentrate, wherein the evaporator is located and configured to receive the primary concentrate either from: (i) the corn oil recovery system; or (ii) the primary filtration system; and a dryer fluidly coupled to the evaporator and configured to receive the wet cake obtained from the separation system, wherein the dryer is located and configured to receive the dewatered primary concentrate from the evaporator and the wet cake from the separation system, wherein the dewatered primary concentrate and the wet cake are combined in the dryer and dried together to produce the high protein animal feed.

2. The system of claim 1, further comprising a secondary filtration system in fluid communication with the primary permeate, the secondary filtration system configured to filter the primary permeate into a secondary concentrate and a secondary permeate.

3. The system of claim 2, wherein the secondary filtration system includes at least one of a tight ultrafiltration system with an average molecular weight cutoff of about 1 kilodalton and a nanofiltration system with a membrane pore size of about 100 daltons to about 500 daltons.

4. The system of claim 2, wherein the secondary filtration system includes a member selected from a group consisting of an ultrafiltration system, a nanofiltration system, and a reverse osmosis system.

5. The system of claim 1, further comprising a water reclamation system in fluid communication with the secondary permeate, the water reclamation system comprising a semipermeable membrane configured to remove water from the secondary permeant to produce a light syrup using a forward osmosis process, a reverse osmosis process, or a combination thereof.

6. The system of claim 1, further comprising an additive reservoir fluidly coupled to the primary permeate, the additive reservoir including an additive to precipitate a phosphate compound from the primary permeate, wherein the additive includes a member selected from a group consisting of:

a source of ammonium ion, a source of magnesium ion, a source of potassium ion, a source of hydroxide ion, and a combination thereof, and at least one of a gravity settler, a centrifuge, or a hydrocyclone, wherein the phosphorus-containing precipitate is precipitated and collected via the at least one of the gravity settler, centrifuge or hydrocyclone.

7. The system of claim 6, comprising a gravity settler by which the phosphorus-containing precipitate is precipitated and collected, and wherein the gravity settler is a tank.

8. The system of claim 1, wherein the primary filtration system is an ultrafiltration system, and the ultrafiltration system is a tight ultrafiltration system.

9. The system of claim 1, wherein the primary filtration system is a microfiltration system.

10. The system of claim 1, wherein the primary permeate comprises less than 100 milligrams per liter of oil.

11. The system of claim 1, wherein the primary permeate comprises no detectable corn oil.

12. The system of claim 1, wherein the separation system includes a centrifuge, and the corn oil recovery system executes the oil recovery process by feeding the primary concentrate enriched with the corn oil through the evaporator, utilizing demulsifiers, to facilitate extraction of the corn oil from the heated primary concentrate.

13. The system of claim 1 further comprising an anaerobic digester, wherein the primary concentrate is anaerobically digested.

14. The system of claim 13, wherein the anaerobic digester is a high-rate treatment reactor.

* * * * *